Figure 1:
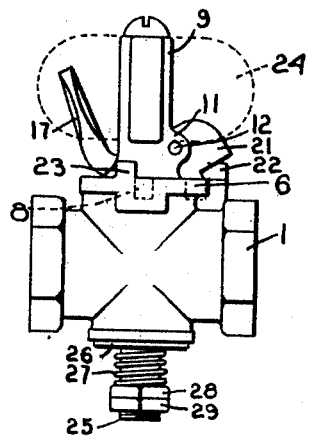

T. G. STRATER.
FAUCET LOCK.
APPLICATION FILED AUG. 4, 1919.

1,388,532.

Patented Aug. 23, 1921.

Inventor.
Theodore G. Strater
by Heard Smith & Tennant.
Attys.

UNITED STATES PATENT OFFICE.

THEODORE G. STRATER, OF BROOKLINE, MASSACHUSETTS.

FAUCET-LOCK.

1,388,532.  Specification of Letters Patent.  Patented Aug. 23, 1921.

Application filed August 4, 1919. Serial No. 315,056.

*To all whom it may concern:*

Be it known that I, THEODORE G. STRATER, a citizen of the United States, and resident of Brookline, county of Suffolk, State of Massachusetts, have invented an Improvement in Faucet-Locks, of which the following description, in connection with the accompanying drawing, is a specification, like characters on the drawing representing like parts.

This invention relates to improvements in valve locks and the object thereof is to provide an improved valve lock which will be of more rigid construction and more efficient in operation than those heretofore constructed. Valves provided with locking means are particularly desirable for use in connection with gas pipes which lead to burners for stoves, heaters and lighting jets which can be caused to lock the valve in closed position so as to prevent an improper escape of the gas.

Many of the locking devices for valves heretofore constructed have been of such light and delicate construction that they have been readily broken and thus rendered ineffective. One of the principal objects of the present invention is to provide a valve lock in which the locking member will be of a strong rigid character and so protected or inclosed, preferably in the valve stem, that it will be out of the way of injury so that when used upon the pipe leading to a heater which may be adjacent the floor the valve will not be likely to be damaged even if struck by the foot or by objects being moved around in the room.

A further object of the invention is to provide a valve lock of the character described in which the spring which actuates the locking device will be inclosed and protected from injury and from the action of the moisture of the air.

A further object of the invention is to provide a neat and ornamental valve which will not have a cumbersome appearance.

Other objects and features of the invention will more fully appear from the following description and the accompanying drawings and will be pointed out in the inclosed claims.

Figure 2:
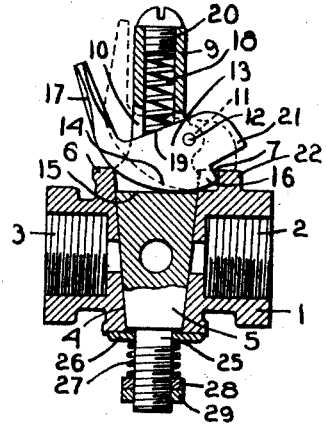
Figure 3:
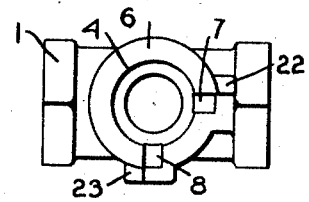

A preferred embodiment of my invention is illustrated in the drawings in which,

Figure 1 is a side elevation of a valve showing in dotted lines the winged head for the stem, Fig. 2 is a vertical longitudinal sectional view of the valve illustrated in Fig. 1, the locking member being shown in elevation, Fig. 3 is a plan view of the valve casing.

The valve shown in Fig. 1 has a valve casing 1 which is provided with internal screw threaded ends 2, 3 by means of which it may be connected into the usual pipe line but which of course may be provided with a nipple to form a connection for a rubber tube. A casing 1 is provided with a transverse, preferably conical aperture 4 which forms a seat for the valve plug 5. The valve casing desirably is provided adjacent the upper end of the aperture with an annular boss 6 which has one or more recesses 7, 8 communicating with the aperture 4, said recess being adapted to receive a locking member and positioned in such a manner as to lock the valve in closed position and such other adjusted position as may be desirable preferably including the wholly opened position as shown in the drawing.

The valve plug 5 has a vertically chambered stem 9 which has a transverse slot 10 extending therethrough. The valve stem 9 desirably has adjacent the sides of the slot laterally extending bosses 11 to receive a stud or shaft 12 forming the pivot for the locking member 13. The locking member 13 may be in the general form of a sector having its curved portion 14 lying closely adjacent the lower wall 15 of the slot 10. The end portion 16 of said sector is so positioned that it will engage the recess 7 or 8 when positioned thereover. In order to operate the locking member a preferably integral handle 17 is provided which extends alongside the valve stem. A spring 18 inclosed in the chambered stem engages the upper edge 19 of the locking member and tends normally to force the locking portion 16 into engagement with the recess. The spring 18 desirably is secured in the chambered stem by means of a screw 20 which is seated in the upper end of the chambered stem and bears upon the upper end of the spring 18.

It is desirable to provide means to limit the rotation of the valve to a quarter turn which will permit it only to move from closed to open position. Means accordingly have been provided for restricting the movement of the valve, such means comprising an extension 21 of said locking member which is adapted to engage lugs 22, 23 extending upwardly from the annular boss 6 and so disposed as to arrest the locking member 21 when the valve is either in open or closed position.

The valve stem 20 may be provided with any suitable form of operating means such as wings 24. In order to hold the valve in its seat the lower end of the valve has the usual screw threaded extension 25 which passes through a washer 26 covering the lower end of the plug aperture, a spring 27 being interposed between said washer and one of a pair of check nuts 28, 29 secured upon the end portion of the extension.

In operation the valve is normally held in the locked position illustrated in the drawing. When it is desired to rotate a valve for the purpose of turning on the gas or other fluid which is to flow through it the operator clasps the wing 24 with the fingers and with the thumb presses upon the lever 17 of the locking member. The locking member is thereby rotated about its pivot 12 until the portion 19 is withdrawn from the recess 16 whereupon the valve can be rotated any desired distance to turn on as much or as little of the fluid as may be desired. After the valve is rotated sufficiently to enable the portion 16 of the locking member to enter another slot it will be locked in such position upon release of the handle 17.

When the locking handle is depressed by the operator to the dotted line position illustrated in Fig. 2 the extension 21 of the locking member is brought down closely adjacent to the boss 6 so that it will unfailingly engage the projection 22 or 23 as the valve plug is rotated thereby limiting the rotation of the valve as above described.

It will be understood that the embodiment of the invention disclosed herein is illustrative and not restrictive and that various changes in construction and arrangement of parts may be made within the spirit and scope of the following claims.

Having thus described my invention what I claim as new and desire to secure by Letters Patent is:

1. A valve comprising a valve casing, a valve plug rotatably mounted therein having a longitudinal chambered and transversely slotted stem and a winged handle, a locking member pivotally mounted in said stem having a handle extending through said slot and turned upwardly adjacent said winged handle, whereby it may be conveniently grasped with said winged handle, said casing having a recess adapted to receive said locking member when the valve is in closed position and a spring in said chambered stem normally tending to force said locking member into engagement with said recess.

2. A valve comprising a valve casing having a plug aperture and a locking recess communicating with said aperture, a plug rotatably mounted in said aperture having a stem provided with a hand piece and having a transverse slot extending through said stem, a locking member pivotally mounted in said stem extending through said slot and having means to engage said recess and provided with a handle extending alongside said hand piece and resilient means inclosed in said stem above said locking member engaging said locking member tending normally to force the locking member into engagement with said recess.

3. A valve comprising a valve casing having a plug aperture and a locking recess communicating with said aperture, a plug rotatably mounted in said aperture having a stem provided with a hand piece and having a transverse slot extending through said stem, a locking member pivotally mounted in said stem extending through said slot and having at one end a handle extending along said hand piece and at the other end means to engage said recess and also an extension projecting over said casing, lugs on said casing for limiting the rotative movement of said extension and resilient means engaging said locking member tending normally to force the locking member into engagement with said recess.

In testimony whereof, I have signed my name to this specification.

THEODORE G. STRATER.